United States Patent
Choi et al.

(10) Patent No.: US 9,521,110 B2
(45) Date of Patent: *Dec. 13, 2016

(54) METHOD AND SYSTEM FOR HANDLING A DYNAMIC HOST CONFIGURATION PROTOCOL INTERNET PROTOCOL VERSION 4 ADDRESS RELEASE

(71) Applicant: Samsung Electronics Co., Ltd., Gyeonggi-do (KR)

(72) Inventors: Sungho Choi, Gyeonggi-do (KR); Erik Guttman, Bangalore (IN); Rahul Suhas Vaidya, Bangalore (IN)

(73) Assignee: Samsung Electronics Co., Ltd (KR)

(*) Notice: Subject to any disclaimer, the term of this patent is extended or adjusted under 35 U.S.C. 154(b) by 51 days.

This patent is subject to a terminal disclaimer.

(21) Appl. No.: 14/579,376

(22) Filed: Dec. 22, 2014

(65) Prior Publication Data

US 2015/0113170 A1    Apr. 23, 2015

Related U.S. Application Data (63) Continuation of application No. 14/255,515, filed on Apr. 17, 2014, which is a continuation of application (Continued)

(30) Foreign Application Priority Data

Aug. 14, 2008 (IN) .................... 1985/CHE/2008

(51) Int. Cl.
*G06F 15/173* (2006.01)
*H04L 29/12* (2006.01)
*H04W 80/04* (2009.01)

(52) U.S. Cl.
CPC ..... *H04L 61/2015* (2013.01); *H04L 29/12301* (2013.01); *H04L 61/2076* (2013.01); *H04L 61/251* (2013.01); *H04W 80/04* (2013.01)

(58) Field of Classification Search
CPC ...... H04L 69/08; H04L 69/24; H04L 61/2007; H04L 69/18; H04L 61/2015; H04L 29/12301
(Continued)

(56) References Cited

U.S. PATENT DOCUMENTS

| 6,965,584 B2 | 11/2005 | Agrawal et al. |
| 2002/0118656 A1 | 8/2002 | Agrawal et al. |

(Continued)

FOREIGN PATENT DOCUMENTS

| CN | 1679297 | 10/2005 |
| JP | 2004-104664 | 4/2004 |

(Continued)

OTHER PUBLICATIONS

3GGP TS 23.402 V8.2.0 Technical Specification, 3rd Generation Partnership Project; Technical Specification Group Services and System Aspects; Architecture enhancements for non-3GPP accesses (Release 8) (Jun. 2008).*

(Continued)

*Primary Examiner* — Waseem Ashraf
*Assistant Examiner* — Charles Murphy
(74) *Attorney, Agent, or Firm* — The Farrell Law Firm, P.C.

(57) ABSTRACT

Methods and apparatuses are provided for releasing an internet protocol (IP) address by a packet data network gateway (PGW) in a mobile communication system. The PGW allocates an IP version 4 (IPv4) address and an IP version 6 (IPv6) address to a terminal to establish a packet data network (PDN) connection between the terminal and the PGW. The PGW identifies a PDN type associated with the PDN connection if an event of releasing the IPv4 address (Continued)

has occurred. The PGW transmits, to a serving gateway (SGW), a binding revocation message, including information indicating release of the IPv4 address, with the PDN connection remaining, if the PDN type is IPv4 and IPv6. The PGW receives a binding revocation acknowledge message in response to the binding revocation request message, from the SGW.

10 Claims, 10 Drawing Sheets

Related U.S. Application Data

No. 13/551,125, filed on Jul. 17, 2012, now Pat. No. 8,954,558, which is a continuation of application No. 12/541,655, filed on Aug. 14, 2009, now Pat. No. 8,250,199.

(58) Field of Classification Search
USPC . 709/227, 230, 225, 223; 370/310; 455/436, 422.1
See application file for complete search history.

(56) References Cited

U.S. PATENT DOCUMENTS

| | | | |
|---|---|---|---|
| 2004/0004940 A1* | 1/2004 | Abrol | H04L 29/12273 370/252 |
| 2004/0029615 A1 | 2/2004 | Gerry et al. | |
| 2004/0199666 A1 | 10/2004 | King et al. | |
| 2004/0203765 A1 | 10/2004 | Das et al. | |
| 2004/0205211 A1 | 10/2004 | Takeda | |
| 2005/0138166 A1* | 6/2005 | Blanchet | H04L 69/16 709/224 |
| 2006/0187881 A1 | 8/2006 | Kwak et al. | |
| 2007/0258399 A1 | 11/2007 | Chen | |
| 2008/0214189 A1* | 9/2008 | Taaghol | H04L 69/08 455/432.2 |

FOREIGN PATENT DOCUMENTS

| | | |
|---|---|---|
| JP | 2005-501483 | 1/2005 |
| KR | 10-0668654 | 1/2007 |
| RU | 2273104 | 3/2006 |
| RU | 2316906 | 2/2008 |

OTHER PUBLICATIONS

3GPP TS 23.401 V8.2.0, 3rd Generation Partnership Project; Technical Specification Group Services and System Aspects; General Packet Radio Service (GPRS) Enhancements for Evolved Universal Terrestrial Radio Access Network (E-UTRAN) Access (Release 8) Internet Citation, Jun. 8, 2008.
3GPP Ts 23.402 V8.2.0, 3rd Generation Partnership Project, Technical Specification Group Services and System Aspects; Architecture Enhancements for Non-3GPP Accesses (Release 8), Jun. 2008.
3GPP Ts 23.402 V8.2.0, 3rd Generation Partnership Project; Technical Specification Group Services and System Aspects; Architecture Enhancements for Non-3GPP Accesses (Release 8), paragraphs 4.7 and 5.4.5, Jun. 9, 2008.
Samsung: "Issues related to IP Address Release in EPC", S2-085454_DHCP_Release, 3GPP Draft; 3rd Generation Partnership Project (3GPP), Aug. 19, 2008.
Droms Bucknell University R: "Dynamic Host Configuration Protocol; rfc2131.txt", IETF Standard, Internet Engineering Task Force, Mar. 1, 1997.
Leung et al., "Wimax Forum/3GPP2 Proxy Mobile IPv4; draft-leung-mip4-proxy-mode-09.txt", Internet Engineering Task Force, IETF Standard Working Draft, Internet Society, Jul. 31, 2008.
A. Muhanna et al., "Binding Revocation for IPv6 Mobility Draft-muhanna-mext-binding-revocation-02.txt", Jul. 11, 2008.
A. Muhanna et al., Binding Revocation for IPv6 Mobility draft-ietf-mext-binding-revocation-00.txt. Cisco Systems, Jul. 31, 2008.
Korean Office Action dated Jul. 29, 2015 issued in counterpart application No. 10-2009-0074600, 8 pages.
3GPP TS 23.401 V8.0.0 Technical Specification, 3rd Generation Partnership Project; Technical Specification Group Services and System Aspects; Architecture Enhancements for non-3GPP accesses (Release 8) (Dec. 2007).
U.S. Office Action dated Dec. 17, 2015 issued in counterpart U.S. Appl. No. 14/579,393, 29 pages.

* cited by examiner

METHOD AND SYSTEM FOR HANDLING A DYNAMIC HOST CONFIGURATION PROTOCOL INTERNET PROTOCOL VERSION 4 ADDRESS RELEASE

PRIORITY

This application is a continuation of U.S. application Ser. No. 14/255,515, filed on Apr. 17, 2014, which is a continuation of U.S. application Ser. No. 13/551,125, filed on Jul. 17, 2012, which is a continuation of U.S. Pat. No. 8,250,199, issued on Aug. 21, 2012, which claims priority under 35 U.S.C. §119(a) to applications filed in the Intellectual Property Office of India on Aug. 14, 2008 and Jul. 31, 2009, which are assigned Indian Priority Document No. 1985/CHE/2008, the entire contents of each of which are incorporated herein by reference.

BACKGROUND OF THE INVENTION

1. Field of the Invention

The present disclosure relates generally to a field of a Third Generation Partnership Project (3GPP) Evolved Packet Core (EPC) and more particularly, to a method and a system for handling a Dynamic Host Configuration Protocol (DHCP) Internet Protocol version 4 (IPv4) address release request with a Proxy Mobile Internet Protocol (PMIP) or a General Packet Radio Service (GPRS) Tunneling Protocol (GTP) based network.

2. Description of the Related Art

The 3GPP EPC supports two types of protocol over an S5 or S8 interface. Here the S5 will have a context of a User Equipment (UE) residing in a home operator and the S8 will have another context of the UE roaming with a visited operator. The two types of protocols include GTP and PMIP. The UE behavior is independent of the protocol. The UE has a Layer 2 (L2) connection with a Serving GateWay (SGW). The S5 or S8 connection can be for GTP or PMIP.

In a GTP based S5 or S8 connection, a GTP tunnel is formed between an SGW and a Packet Data Network (PDN) GW. For a PMIP based an S5 or S8 connection, a PMIP tunnel is formed between the UE and PDN GW.

In the existing techniques, the PDN includes a connection related context in the UE, a Mobile Management Entity (MME), an SGW, and a PDN GW. The context may or may not include an IP address.

A PDN connection can be allocated to at least one of an IPv4 address and an IPv6 address. A Binding Revocation (BR) is used by the Local Mobility Anchor (LMA) to revoke a binding for a particular UE. Further, for the PDN connection utilizing the PMIP based S5 or S8, the IP address forms integral part of the PMIP tunnel between the PDN GW and the SGW. According to the PMIP version 6 (PMIPv6), a Binding Cache Entry (BCE) and a Binding Update List (BUL) cannot be maintained without an IP address allocated for the UE. However in the existing techniques, the PDN connection may be lost when the IP address is deleted.

In light of the foregoing, there is a need for an efficient technique of handling a DHCP version 4 (IPv4) address release request with a PMIP or GTP based network.

SUMMARY OF THE INVENTION

The present invention has been made to address at least the above problems and/or disadvantages and to provide at least the advantages described below. Accordingly, embodiments of the present disclosure described herein provide methods and systems for handling a DHCP IPv4 address release request with a PMIP or GTP based network.

In accordance with an aspect of the present invention, a method is provided for releasing an IP address by a PDN gateway (PGW) in a mobile communication system. The PGW allocates an IPv4 address and an IPv6 address to a terminal to establish a PDN connection between the terminal and the PGW. The PGW identifies a PDN type associated with the PDN connection if an event of releasing the IPv4 address has occurred. The PGW transmits, to a SGW, a binding revocation message, including information indicating release of the IPv4 address, with the PDN connection remaining, if the PDN type is IPv4 and IPv6. The PGW receives a binding revocation acknowledge message in response to the binding revocation request message, from the SGW.

In accordance with another aspect of the present invention, a PGW is provided in a mobile communication system. The PGW includes a transceiver for transmitting and receiving a signal. The PGW also includes a controller for allocating an IPv4 address and an IPv6 address to a terminal to establish a PDN connection between the terminal and the PGW, for identifying a PDN type associated with the PDN connection if an event of releasing the IPv4 address has occurred, for transmitting, to a SGW, a binding revocation message, including information indicating release of the IPv4 address, with the PDN connection remaining, if the PDN type is IPv4 and IPv6, and for receiving a binding revocation acknowledge message in response to the binding revocation message.

BRIEF DESCRIPTION OF THE DRAWINGS

The above and other aspects, features, and advantages of the present invention will be more apparent from the following detailed description when taken in conjunction with the accompanying drawings, in which.

In the accompanying figures, similar reference numerals may refer to identical or functionally similar elements. These reference numerals are used in the detailed description to illustrate various embodiments and to explain various aspects and advantages of the present disclosure.

Further, persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION OF THE EMBODIMENTS OF THE INVENTION

It should be observed that various method steps and system components have been represented by conventional symbols in the figures, showing only specific details that are relevant for an understanding of the present disclosure. Further, details that may be readily apparent to a person ordinarily skilled in the art may not have been disclosed. Additionally, in the present disclosure, relational terms such as first and second, source and target, etc., may be used to distinguish one entity from another entity, without necessarily implying any actual relationship or order between such entities.

Embodiments of the present disclosure described herein provide methods and systems for handling a DHCP IPv4 address release request with a Proxy Mobile Internet Protocol (PMIP) or a General Packet Radio Service (GPRS) Tunneling Protocol (GTP) based network.

Figure 1:
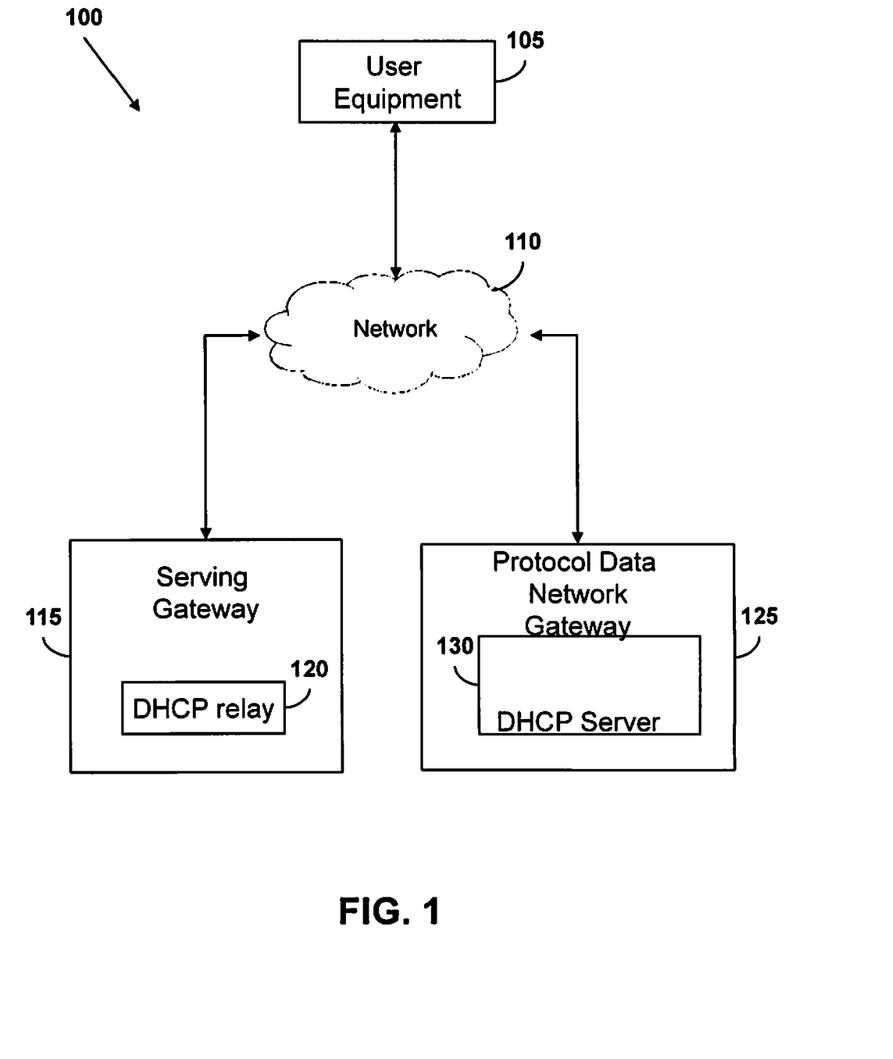
FIG. 1 illustrates a system for deleting a DHCP release in a Proxy Mobile Internet Protocol version 6 (PMIPv6) of a 3GPP Evolved Packet Core (EPC), in accordance with an embodiment of the present invention.

FIG. 1 illustrates a system for deleting a DHCP release in PMIPv6 of a third Generation Partnership Project (3GPP) Evolved Packet Core (EPC), in accordance with an embodiment of the present invention. An environment 100 includes a User Equipment (UE) 105, such as a mobile phone, a computer, a camcorder, a television, and a Personal Digital Assistant (PDA). A network 110 is connected to a Serving GateWay (SGW) 115 and a PDN GW 125. The SGW further includes a DHCP relay 120, which is used to transmit a DHCP release request between an UE and a PMIPv6 LMA.

Figure 2:
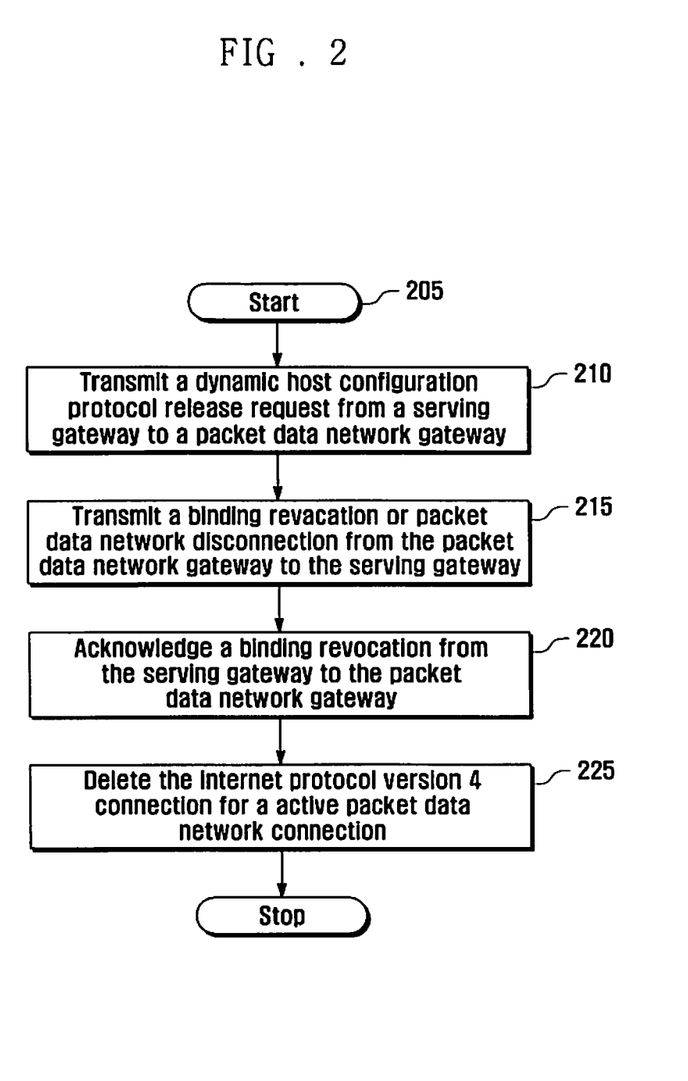
FIG. 2 is a flowchart illustrating a method for releasing an IP version 4 address using a DHCP release in PMIPv6 of a 3GPP EPC, in accordance with an embodiment of the present invention.

The PDN GW 125 includes a DHCP Server 130. Further, although not illustrated, the PDN GW 125 includes a Local Mobility Anchor (LMA) for revoking a binding for a UE. A link exists between the SGW and the UE and a PMIPv6 tunnel exists between the SGW and PDN GW server to transmit a DHCP release request FIG. 2 is a flowchart illustrating a method for releasing an IPv4 address using a DHCP release in a PMIPv6 of a 3GPP EPC, in accordance with an embodiment of the present invention.

In step 205, the method is started by activating a PDN connection between the UE and the SGW, and allocating the UE with an IPv4 address. The UE uses a DHCP for obtaining the IP address. A connection is also activated between a SGW and a PDN GW.

In step 210, a DHCP release request is transmitted from the SGW to the PDN GW. The IP address allocated to the UE is released. The DHCP server further triggers the IP address release procedure with an LMA function associated with PDN GW. The DHCP server receives the DHCP release message, and the IP address allocated to the UE is released. The DHCP server also triggers the IP address release procedure with the LMA function associated with PDN GW. The LMA includes an indication, e.g., a bit or a flag in the PMIPv6 message, to the SGW. The LMA indication indicates an initiation by the LMA not to delete the PDN connection. Accordingly, the above-described process will retain the PDN connection as active. The PDN connection context is then deleted by the PDN GW keeping the connection active in the SGW, a Mobile Management Entity (MME), and a UE.

In step 215, a Binding Revocation (BR) or a PDN disconnection is transmitted from the PDN GW to the SGW.

In accordance with an embodiment of the present invention, the BR is transmitted by allocating a dummy IP address to keep the PDN connection active.

In accordance with another embodiment of the present invention, a flag specific to the IPv4 to be deleted is provided.

In step 220, a BR ACKnowledgement (ACK) is provided from the SGW to the PDN GW.

In step 225, the IPv4 connection for the active PDN connection is deleted. The SGW deletes the connection after receiving the DHCP release request and updates the PDN connection for deleting the IP address configuration information.

In accordance with an embodiment of the present invention, deleting the IPv4 connection includes removing an actual IP address and updating a dummy IP address from the PDN GW to the SGW to keep the PDN connection active.

In accordance with an embodiment of the present invention, the SGW interprets the DHCP request and initiates the Proxy Binding Update (PBU) towards the PDN GW.

Figure 3:
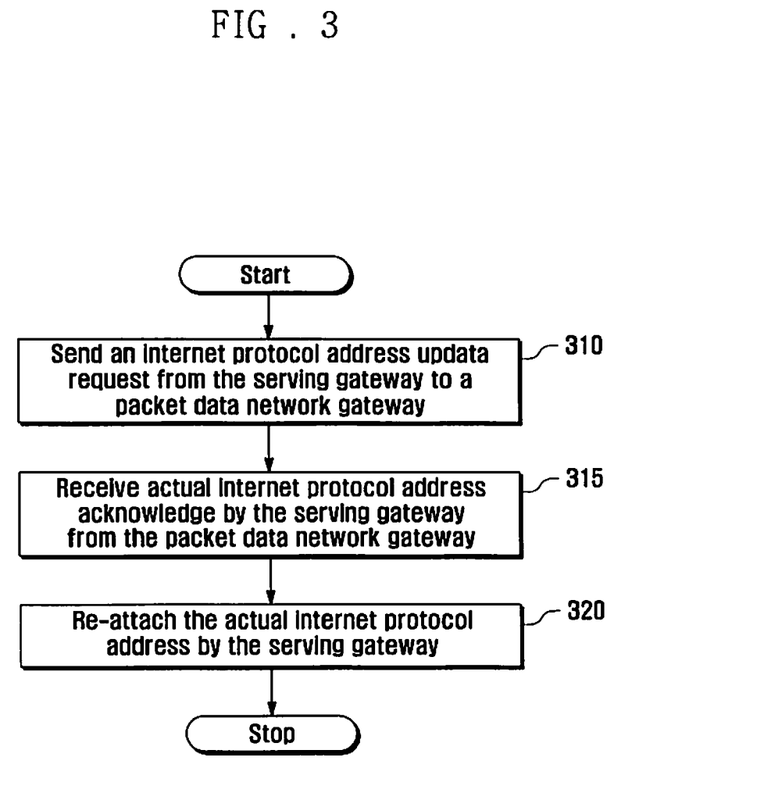
FIG. 3 is a flowchart illustrating a method for re-allocating IP version 4 address using the DHCP version 4 request, after an IP address is deleted by the DHCP release, in accordance with an embodiment of the present invention.

FIG. 3 is a flowchart illustrating a method for re-allocating an IPv4 address using the DHCP version 4 request, after an IP address is deleted by the DHCP release, in accordance with an embodiment of the present invention.

In step 310, an IP address update request is sent from an SGW to a PDN GW. The SGW, which includes the PDN connection context with a dummy IP address, sends a PBU to the PDN GW with an indication to allocate a Home Address (HoA). As part of processing the PBU, the PDN GW allocates an IP address and replies with an actual IP Address.

In step 315, the PDN GW sends an actual IP address ACK to the SGW.

In step 320, the actual IP address is re-attached by the SGW, upon receiving the IP address acknowledgement. The UE confirms the IP address received from the DHCP server.

In accordance with an embodiment of the present invention, a PMIPv6 between the SGW and the PDN GW may be deleted. If the UE requests an IPv4 address for the PDN connection, the PMIP tunnel is updated between the SGW and the PDN GW.

Figure 4:
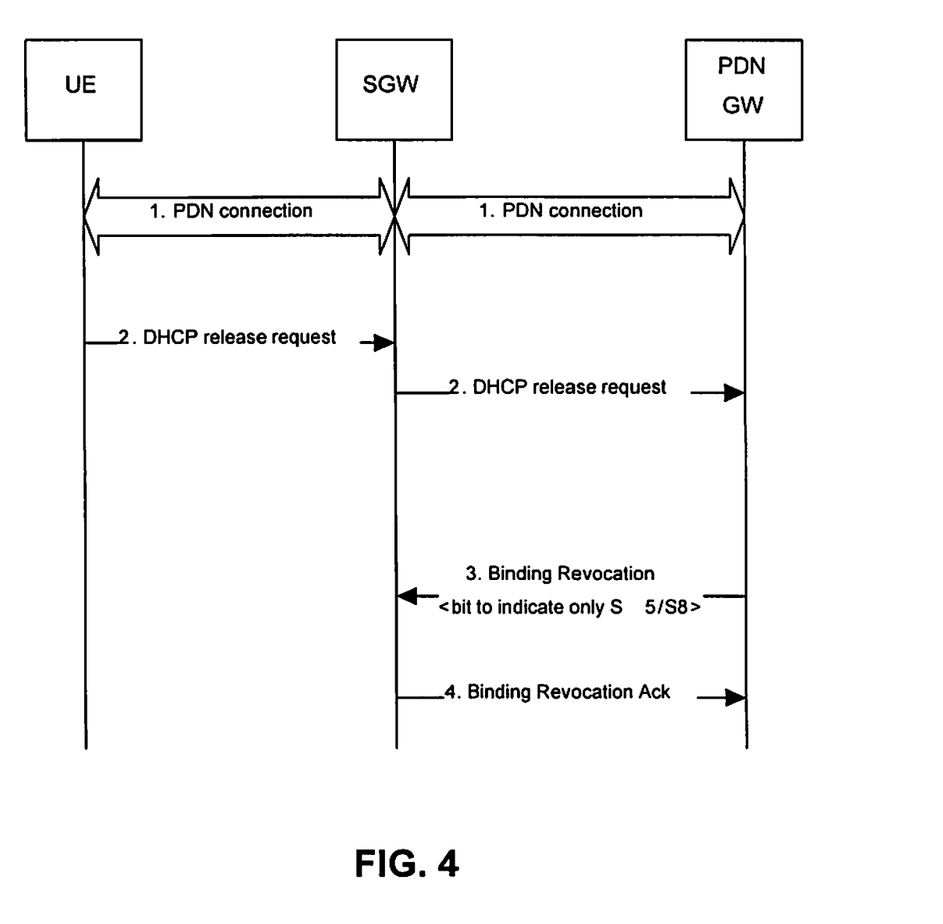
FIG. 4 is a flow diagram illustrating a method for deleting a connection between a SGW and a PGW, in accordance with an embodiment of the present invention.

FIG. 4 is a flow diagram illustrating a method for deleting a connection between an SGW and a PDN gateway, in accordance with an embodiment of the present invention. In step 1, a PDN connection is activated for a UE by allocating an IPv4 address. The UE uses a DHCP to obtain the IP address and to configure one or more parameters in an IP stack. In step 2, the UE initiates the DHCP release for releasing the IP address by sending a request for releasing the IP address to the SGW. The DHCP release request is relayed by the SGW, i.e., a DHCP relay, to the PDN GW. The PDN GW is located at the DHCP server. If the DHCP server receives the DHCP release request, the IP address allocated to the UE will be released. The DHCP server triggers the IP address release procedure with an LMA function associated with the PDN GW. In step 3, an LMA initiates a PMIP binding revocation procedure. The binding revocation procedure is used by the PDN GW for deleting the PDN connection, and an indication is used to differentiate between the binding revocation procedure and the PDN disconnection procedure. The LMA indicates the SGW of the initiation of the binding revocation procedure by the LMA in order to delete the S5 or S8 context for the PDN GW, while keeping the PDN connection active. For example, the S5 or S8 connection only indication can be indicated by a bit or a flag in the PMIPv6 message. The SGW deletes the one of a S5 and S8 context, thereby maintaining the active PDN connection in the SGW, a Mobile Management Entity (MME), and the UE. The SGW receives a Binding Revocation Indication (BRI) and deletes the one of an S5 and S8, and then updates the PDN connection to delete the IP address configuration information. In step 4, the SGW sends a BR ACK to the PDN GW.

In accordance with an embodiment of the present invention, the SGW can interpret the DHCP request and then initiate the PBU towards the PDN GW.

Figure 5:
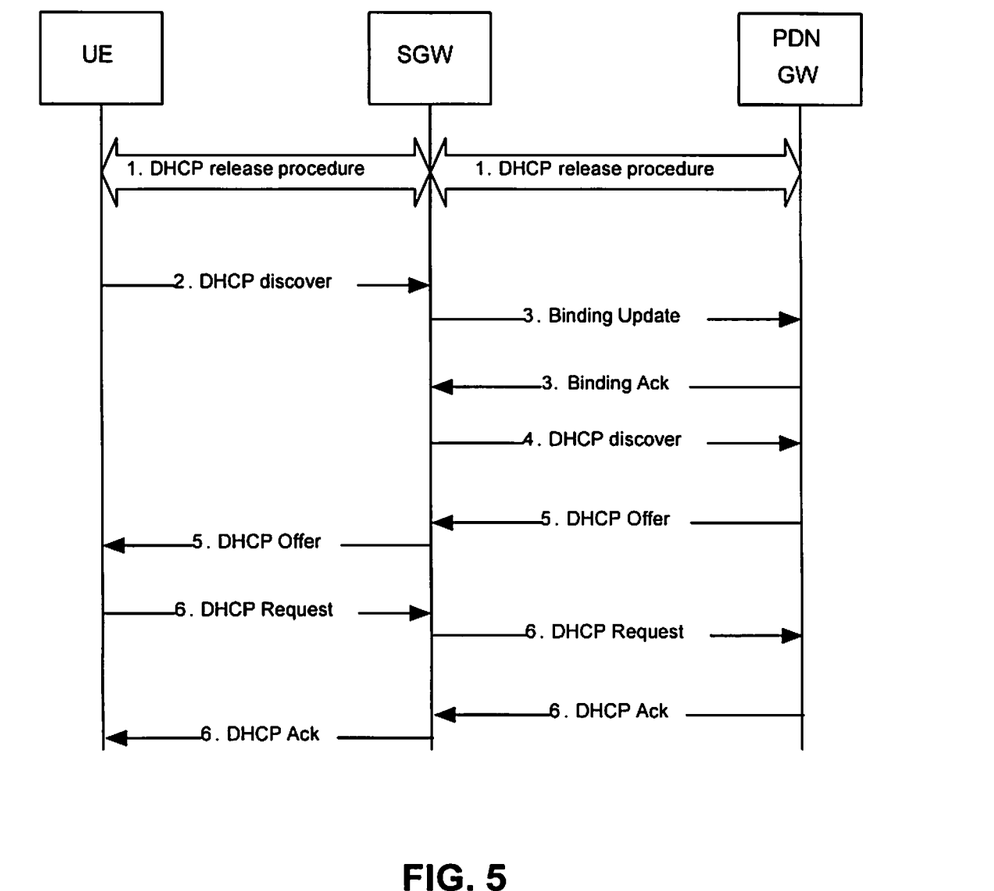
FIG. 5 is a flow diagram illustrating a method for triggering a DHCP release, after the UE requests for an IP address, in accordance with an embodiment of the present invention.

FIG. 5 is a flow diagram illustrating a method for triggering a DHCP release after a UE requests an IP address, in accordance with an embodiment of the present invention.

In step 1, the UE releases an IPv4 address for a PDN connection allocated with the IPv4 address. That is, the UE performs a DHCP release procedure. In step 2, the UE initiates a DHCP discover procedure to procure an IPv4 address.

In step 3, the SGW includes the context related to the PDN connection for the UE and the DHCP discover message, which is a DHCP protocol message defined in DHCP RFC, is buffered by a DHCP relay included in the SGW. The SGW in turn initiates a PBU procedure to obtain an IP address by sending a Proxy Binding Update (PBU) to the PDN GW. The PDN GW processes the PBU normally like a new PDN connection and allocates an IP address. The PBU is included in the PMIP Binding Acknowledgement (PBA) transmitted to the SGW.

In step 4, the DHCP relay in the SGW forwards the DHCP discover message from the UE to the PDN GW.

In step 5, a DHCP offer is transmitted from the SGW to the UE. The DHCP offer includes the IP address, which was allocated in the PBA.

In accordance with an embodiment of the present invention, the IP address can be the previously allocated IP address. In accordance with another embodiment, a new IP address can be allocated.

In step 6, the UE confirms the IP address received from the DHCP server in PDN GW by transmitting DHCP Request for the allocated IP address. The DHCP transaction is complete by the DHCP Server Acknowledging the DHCP request.

Figure 6:
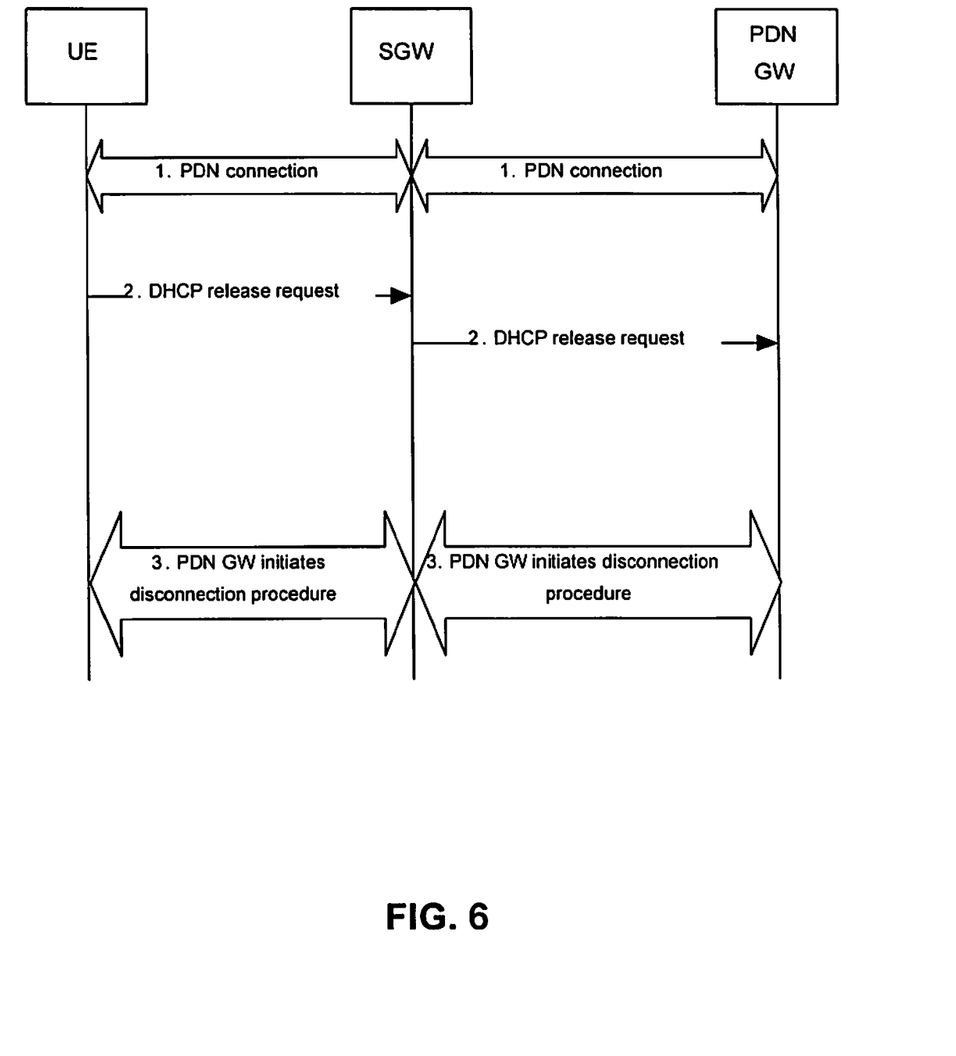
FIG. 6 is a flow diagram illustrating a method for initiating a packet data disconnection procedure for a PDN GW, in accordance with an embodiment of the present invention.

FIG. 6 is a flow diagram illustrating a method for initiating a packet data disconnection procedure for a PDN GW, in accordance with an embodiment of the present invention.

In step 1, a PDN connection is active for the UE. That is, the UE is allocated with an IPv4 address, and uses a DHCP for obtaining the IP address and for configuring one ore more parameters in an IP stack.

In Step 2, the UE decides to release the IP address. More specifically, because the UE has used the DHCP for configuring the IP address, the UE initiates the DHCP release for releasing the IP address by transmitting a DHCP release request to the SGW. The DHCP release request is then relayed by a DHCP relay included in the SGW to the DHCP server.

In Step 3, after receiving the DHCP release request, the IP address allocated to the UE is released by the PDN GW. The DHCP server triggers the PDN GW and initiates a procedure for the PDN GW disconnection procedure. The procedure releases the PDN connection (S5 or S8) context in the network and the UE.

In accordance with another embodiment of the present invention, the SGW may interpret the DHCP request in step 2 and initiates the PDN disconnection procedure towards the UE and towards the PDN GW.

Figure 7:
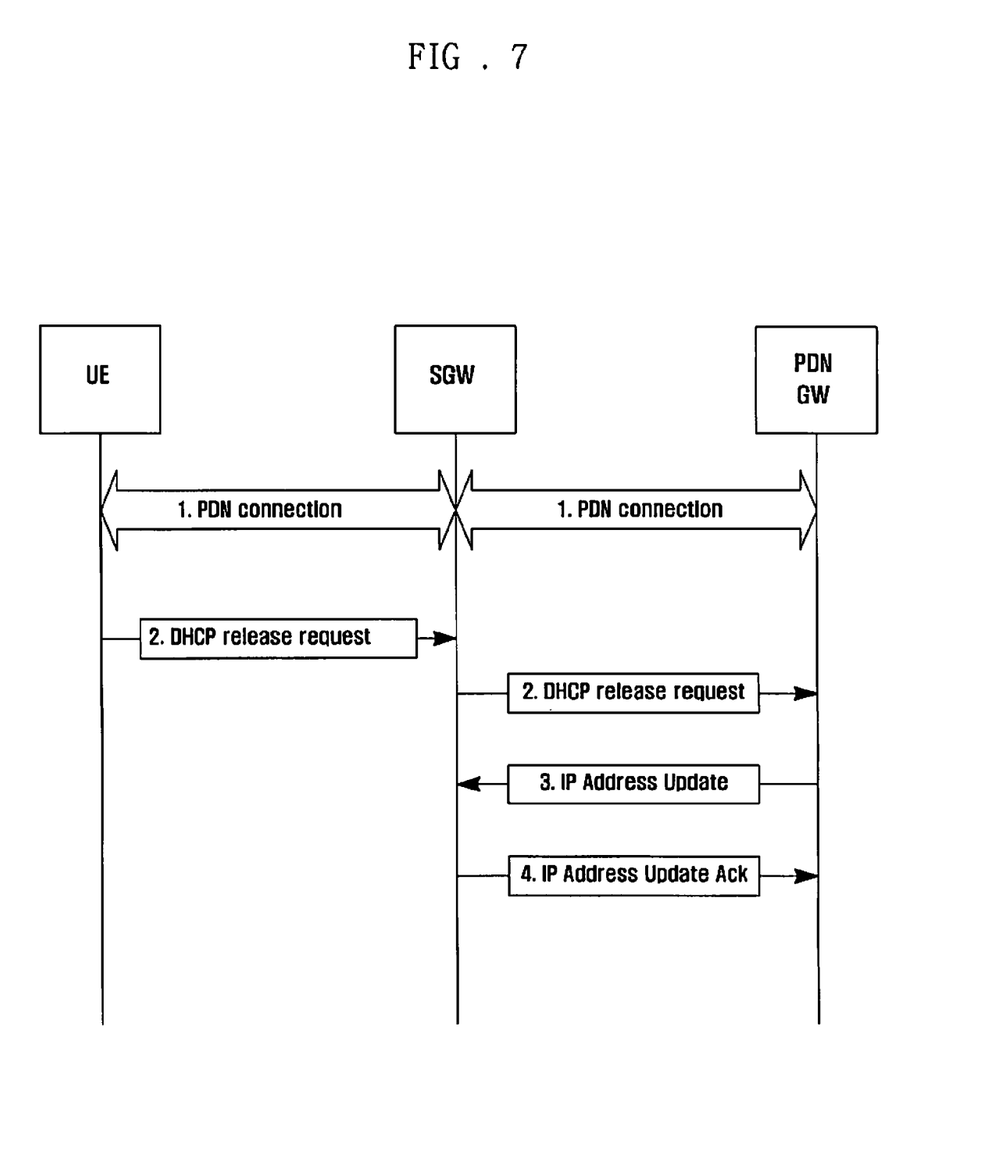
FIG. 7 is a flow diagram illustrating a method for retaining a connection active between the SGW and a PDN GW, using a dummy IP address, in accordance with an embodiment of the present invention.

FIG. 7 is a flow diagram illustrating a method for retaining an active connection between an SGW and a PDN GW, using a dummy IP address, in accordance with an embodiment of the present invention.

An IP address allocated to a UE is used for tunneling between a MAG and an LMA. The S5 or S8 tunnel between MAG and LMA establishes the PDN connection. Here, the S5 will have a context of a UE residing in the home PLMN and the S8 will have another context of a UE roaming in Visited PLMN. The tunnel can be modified to provide a dummy IP address in a Binding Cache Entry (BCE). The BCE includes a UE Network Access Identifier (NAI) and an Access Point Name (APN) for identifying the PDN connection and to be identified in future for further transactions, such as a PDN disconnect procedure or an IP address re-attach triggered by a UE initiated DHCP discover message.

In step 1, a PDN connection is active for the UE. That is, the UE is allocated an IPv4 address, and uses a DHCP for obtaining the IP address and for configuring one or more parameters in an IP stack.

In step 2, the UE makes a decision to release the IP address and transmits a DHCP release request to the SGW. The DHCP release request is relayed by the DHCP relay included in the SGW to the PDN GW. As illustrated in FIG. 5, the IP address allocated to the UE is released by the PDN GW, after receiving the DHCP release request. More specifically, the DHCP server triggers the IP address release procedure with an LMA function associated with the PDN GW.

In step 3, the PDN GW sends an IP address update message to the SGW, including a dummy IP address, for example (0.0.0.0). The updated IP address message can be a binding revocation with an optional field for updating a Binding Update List (BUL). The IP address message replaces a HoA allocated to the UE with a temporary IP address. The entry in the BUL indicates that the PDN connection is not related to any IP address.

In step 4, the SGW sends an IP address update ACK to the PDN GW.

In accordance with another embodiment of the present invention, the SGW can interpret the DHCP request and can initiate an IP address update message towards the PDN GW. Thereafter, DHCP release request is relayed by the DHCP relay included in the SGW to the PDN GW.

Figure 8:
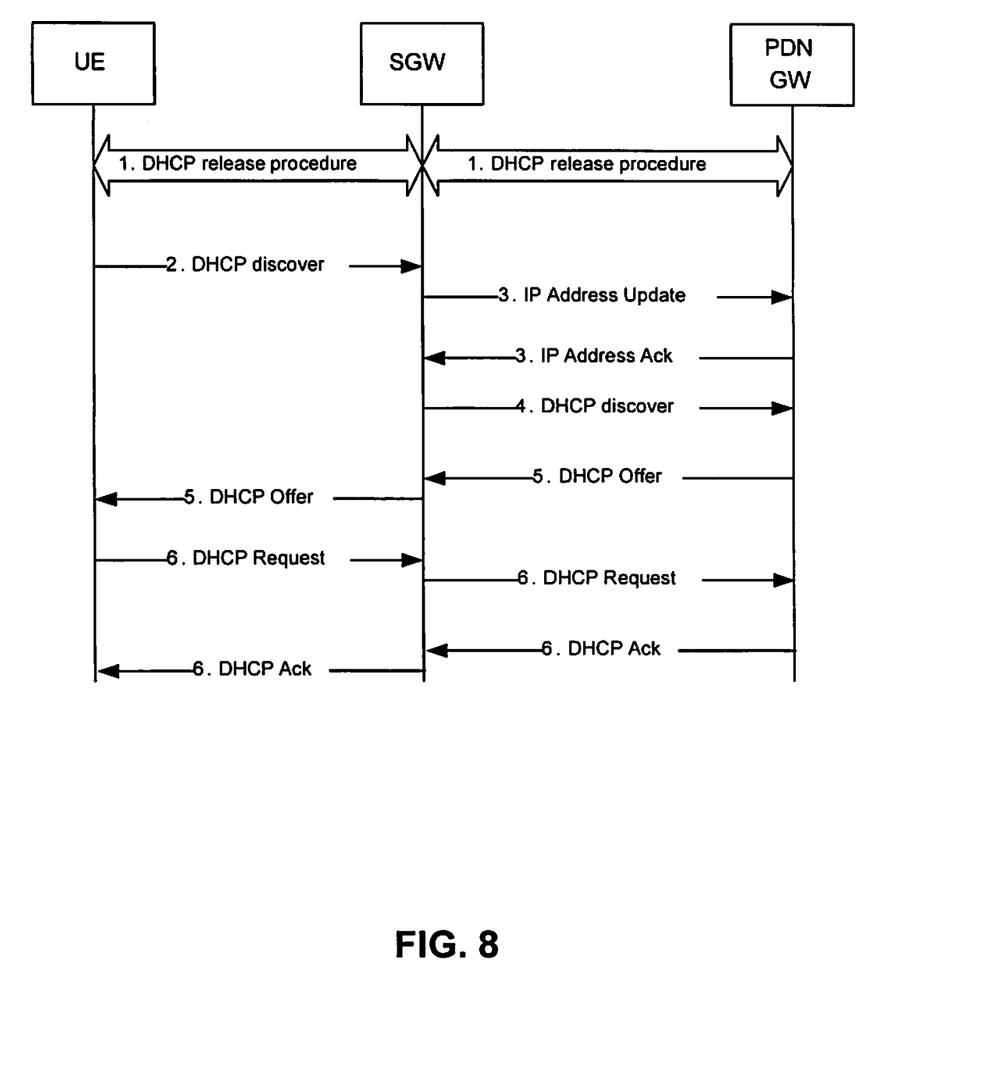
FIG. 8 is a flow diagram illustrating a method for re-attaching an actual IP address with the dummy IP address, in accordance with an embodiment of the present invention.

FIG. 8 is a flow diagram illustrating a method for re-attaching an actual IP address with a dummy IP address, in accordance with an embodiment of the present invention.

In step 1, a UE releases an IPv4 address for the PDN connection for which the UE has allocated the IPv4 address, as described in FIG. 7.

In step 2, the UE requests an IPv4 address. That is, the UE initiates a DHCP discover procedure to procure an IP address.

In step 3, an SGW includes the PDN connection context with a dummy IP address. The SGW sends a PBU to the PDN GW with an indication to allocate an HoA. The PDN GW allocates an IP address and responds back with an actual IP Address.

In step 4, a DHCP relay in the SGW forwards the DHCP discover message from the UE to the PDN GW.

In step 5, the DHCP offer contains the same IP address as allocated in the determined PBA. The IP address may be same as the IP address previously allocated to the same UE.

In Step 6, the UE confirms the IP address received from the DHCP server in PDN GW by transmitting DHCP Request for the allocated IP address. The DHCP transaction is complete by the DHCP Server Acknowledging the DHCP request.

In accordance with an embodiment of the present invention, the SGW forwards the DHCP request to PDN GW. The PDN GW can allocate a new IP address and send the new IP address message to the SGW. Alternatively, in accordance with another embodiment of the present invention, the SGW can interpret the DHCP relay message for obtaining an IP address allocated to the UE and can adjust the BUL according to the allocated IP address.

In accordance with an embodiment of the present invention, the PDN connection is kept active, after the UE requests release of the IP address by keeping a dummy DHCP server, by keeping the IP address active along with the tunnel. The dummy DHCP server is associated with the PDN GW. The associated dummy DHCP server may not allocate resources. Rather, the dummy DHCP server replies with the IP address indicated by the PDN GW. The PDN GW can manage the PDN GW IP addresses or can contact an independent DHCP server to get allocation of IP addresses for a plurality of UEs. Thus, the processing of the IP address release request by the associated DHCP server does not release the IP address for use by other UEs.

If the UE is connected to a PDN connection with IPv4 or IPv6 addresses being allocated, and the DHCP release procedure releases the IPv4 address, the BCE in an LMA and BUL in an MAG are updated to remove the IPv4 address.

To remove the IPv4 address, the LMA sends a binding revocation message to the MAG. The binding revocation message includes an indication that only the IPv4 address is to be revoked. This revoking of the IPv4 address is made by including a separate indicator in a BRI or by excluding the IPv6 Home Network Prefix (HNP) in the BRI.

Figure 9:
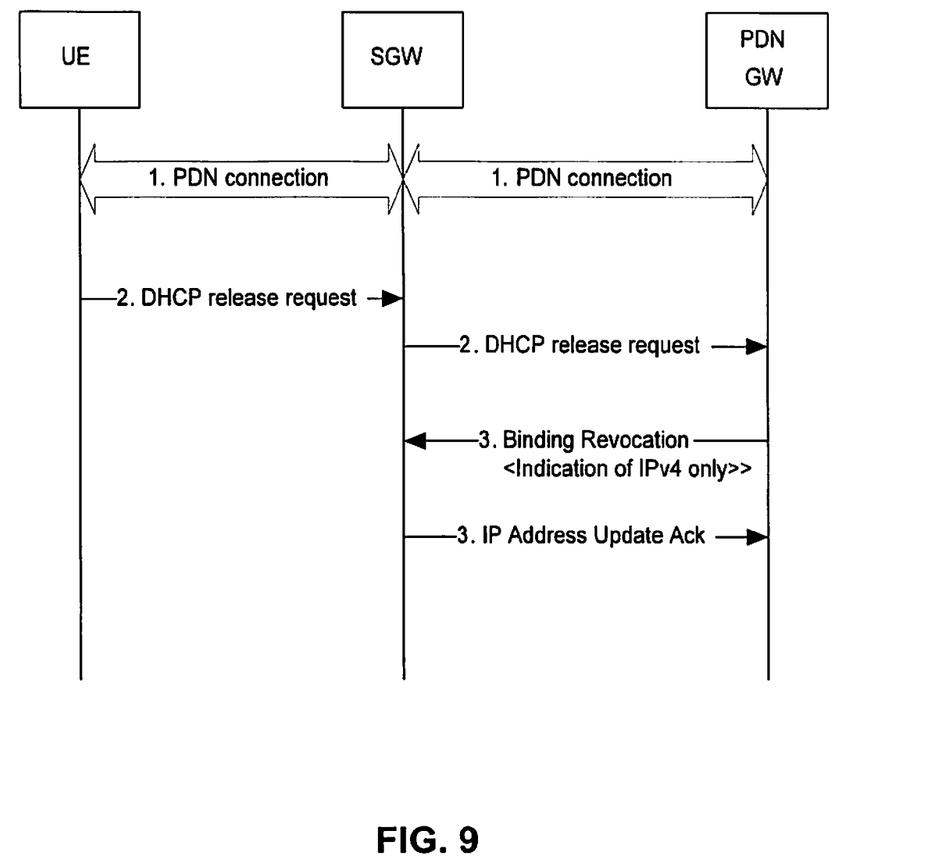
FIG. 9 is a flow diagram illustrating a method for deleting a PDN initiated IP version 4 address, in accordance with an embodiment of the present invention.

FIG. 9 is a flow diagram illustrating a method for deleting a PDN initiated IP version 4 address, in accordance with an embodiment of the present invention.

In the step 1, a PDN connection is active for the UE and the UE is allocated with IPv4 and IPv6 addresses. The UE uses a DHCP for obtaining the IP address and possibly for configuring one or more IP parameters.

In step 2, the UE makes a decision for releasing the IP address and sends a DHCP release message to the SGW, which is relayed by the SGW to the DHCP server associated with PDN GW.

In step 3, the DHCP server triggers a BRI for the IPv4 address only. The SGW releases the IPv4 address and can trigger the release of resources corresponding to IPv4 address. The SGW acknowledges the BRI with a BRA.

In accordance with an embodiment of the present invention, the IPv4 address can be removed after receiving the DHCP release message from the UE, and the SGW can initiate the PBU with lifetime zero so as to deregister the binding with an indication of releasing the IPv4 address. The releasing of the IPv4 can be done by including the IPv4 address in the PBU or by including a special indicator in the PBU.

Figure 10:
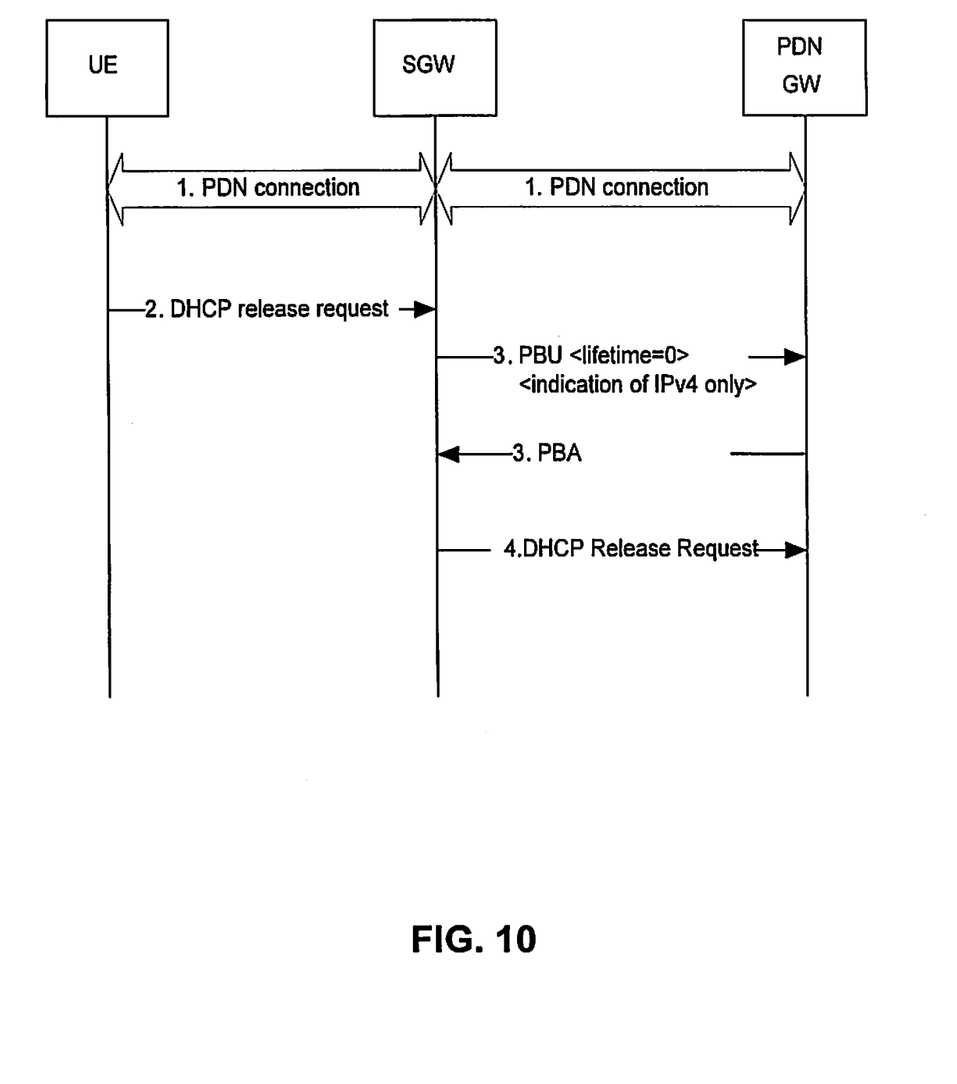
FIG. 10 is a flow diagram illustrating a method for deleting the SGW initiated IP version 4 address, in accordance with an embodiment of the present invention.

FIG. 10 is as flow diagram illustrating a method for deleting a SGW initiated IP version 4 address, in accordance with an embodiment of the present invention.

In step 1, a PDN connection is active for the UE and the UE is allocated with IPv4 and IPv6 addresses. The UE uses a DHCP to obtain the IP address for configuring one or more IP parameters.

In step 2, the UE makes a decision to release the IP address and sends the DHCP release message to the SGW.

In step 3, the DHCP relay triggers a PBU (lifetime=0) with an indication triggering the PBU for IPv4 address.

In accordance with an embodiment of the present invention, the PBU may include only an IPv4 address indicating to the LMA the request is for IPv4 address. The PDN GW releases the IPv4 address and acknowledges the PBU, using a PBA.

In Step 4, the DHCP request from the UE is relayed to the DHCP server associated with PDN GW. The IPv4 address allocated for the UE is released. Upon receipt of the IPv4 delete message from Binding Update List (BUL), the SGW can initiate an "update bearer" message for updating a Service GPRS Support Node (SGSN) of the latest IP addresses in use.

In the preceding specification, the present disclosure and its advantages have been described with reference to specific embodiments. However, it will be apparent to a person of ordinary skill in the art that various modifications and changes can be made, without departing from the spirit and scope of the present disclosure, as set forth in the claims below. Accordingly, the specification and figures are to be regarded as illustrative examples of the present disclosure, rather than in restrictive sense. All such possible modifications are intended to be included within the scope of present disclosure.

What is claimed is:

1. A method for releasing an internet protocol (IP) address by a packet data network gateway (PGW) in a mobile communication system, the method comprising:
    allocating an IP version 4 (IPv4) address and an IP version 6 (IPv6) address to a terminal to establish a packet data network (PDN) connection between the terminal and the PGW;
    detecting release of the IPv4 address allocated to the terminal;
    identifying a PDN type associated with the PDN connection in response to detecting the release of the IPv4 address;
    transmitting to a serving gateway (SGW), a binding revocation message if the identified PDN type is IPv4 and IPv6, the binding revocation message including information indicating that the IPv4 address is released and the PDN connection is maintained; and
    receiving, from the SGW, a binding revocation acknowledge message in response to the binding revocation request message.

2. The method of claim 1, further comprising:
    determining that the event of releasing the IPv4 address has occurred if the PGW receives a dynamic host configuration protocol (DHCP) release request from the SGW.

3. The method of claim 2, wherein the DHCP release request message is relayed by a DHCP relay in the SGW to a DHCP server in the PGW.

4. The method of claim 1, wherein the PGW is configured to act as a DHCP version 4 (DHCPv4) server.

5. The method of claim 1, wherein the SGW is configured to act as a DHCPv4 relay agent.

6. A packet data network gateway (PGW) in a mobile communication system, the PGW comprising:
   a transceiver for transmitting and receiving a signal; and
   a controller for allocating an IP version 4 (IPv4) address and an IP version 6 (IPv6) address to a terminal to establish a packet data network (PDN) connection between the terminal and the PGW, for detecting release of the IPv4 address allocated to the terminal, for identifying a PDN type associated with the PDN connection in response to detecting the release of the IPv4 address, for transmitting, to a serving gateway (SGW), a binding revocation message if the identified PDN type is IPv4 and IPv6, the binding revocation message including information indicating that the IPv4 address is released and the PDN connection is maintained, and for receiving, from the SGW, a binding revocation acknowledge message in response to the binding revocation message.

7. The PGW of claim 6, wherein the controller determines that an event of releasing the IPv4 address has occurred if the PGW receives a dynamic host configuration protocol (DHCP) release request from the SGW.

8. The PGW of claim 7, wherein the DHCP release request message is relayed by a DHCP relay in the SGW to a DHCP server in the PGW.

9. The PGW of claim 6, wherein the PGW is configured to act as a DHCP version 4 (DHCPv4) server.

10. The PGW of claim 6, wherein the SGW is configured to act as a DHCPv4 relay agent.

* * * * *